United States Patent
Peeler

(10) Patent No.: US 10,542,037 B2
(45) Date of Patent: Jan. 21, 2020

(54) DENIAL OF SERVICE PROTECTION FOR IP TELEPHONY SYSTEMS

(71) Applicant: GENBAND US LLC, Frisco, TX (US)

(72) Inventor: Danny Lee Peeler, Apex, NC (US)

(73) Assignee: GENBAND US LLC, Plano, TX (US)

(*) Notice: Subject to any disclaimer, the term of this patent is extended or adjusted under 35 U.S.C. 154(b) by 0 days.

(21) Appl. No.: 14/804,555

(22) Filed: Jul. 21, 2015

(65) Prior Publication Data

US 2017/0026404 A1    Jan. 26, 2017

(51) Int. Cl.
*H04L 29/06* (2006.01)

(52) U.S. Cl.
CPC ...... *H04L 63/1458* (2013.01); *H04L 63/1416* (2013.01)

(58) Field of Classification Search
CPC .................. H04L 63/1458; H04L 63/1416
See application file for complete search history.

(56) References Cited

U.S. PATENT DOCUMENTS

| | | | | |
|---|---|---|---|---|
| 6,069,941 A * | 5/2000 | Byrd | ................ | G06Q 20/1235 379/111 |
| 6,625,119 B1 * | 9/2003 | Schuster | ............... | H04M 3/365 370/230 |
| 7,301,905 B1 * | 11/2007 | Tontiruttananon | ...... | H04L 47/10 370/232 |
| 8,667,579 B2 * | 3/2014 | Leeder | ................. | H04W 12/06 726/20 |
| 9,319,520 B1 * | 4/2016 | Kondapalli | ......... | H04M 3/4285 |
| 9,634,993 B2 * | 4/2017 | Holloway | ............. | G06F 16/958 |
| 2002/0059376 A1 * | 5/2002 | Schwartz | .......... | H04L 29/06027 709/204 |
| 2004/0001437 A1 * | 1/2004 | Duncan | ................. | H04W 28/26 370/232 |
| 2005/0201414 A1 * | 9/2005 | Awais | ............... | H04L 29/06027 370/468 |
| 2007/0121596 A1 * | 5/2007 | Kurapati | ........... | H04L 29/06027 370/356 |

(Continued)

OTHER PUBLICATIONS

NPL Search (Google Scholar) (Year: 2019).*

*Primary Examiner* — Samson B Lemma
*Assistant Examiner* — Richard W Cruz-Franqui
(74) *Attorney, Agent, or Firm* — Fogarty LLP

(57) ABSTRACT

A system and method for protecting components of an IP telephony network whereby a protection scheme is enabled upon detection of resource exhaustion within the network that prevents delivery of incoming messages. Resource exhaustion may result from denial of service attacks and/or malfunctions in automated dialing systems. Once a protection scheme is enabled, the system activates mechanisms for identifying calling parties that are suspected of contributing to the resource exhaustion condition. These suspected calling parties may be placed in a blocked sender list, either manually or automatically. Calling parties may be presented with a challenge function in order to determine whether the call is being made by an automated dialing system. The system blocks incoming calls from calling parties identified in the blocked sender list either permanently or for a specified time duration. The protection scheme remains enabled for a specified duration or until the resource exhaustion condition has subsided.

20 Claims, 5 Drawing Sheets

(56) References Cited

U.S. PATENT DOCUMENTS

| | | | | |
|---|---|---|---|---|
| 2007/0143624 A1* | 6/2007 | Steeves | G06F 21/36 | 713/182 |
| 2008/0008296 A1* | 1/2008 | Williams | H04M 3/42221 | 379/85 |
| 2008/0031153 A1* | 2/2008 | Punreddy | H04L 43/0829 | 370/252 |
| 2009/0274040 A1* | 11/2009 | Karacali-Akyamac | H04L 47/10 | 370/216 |
| 2010/0036953 A1* | 2/2010 | Bogovic | H04L 45/30 | 709/226 |
| 2010/0284284 A1* | 11/2010 | Khandelwal | H04W 76/18 | 370/248 |
| 2012/0014332 A1* | 1/2012 | Smith | H04W 16/14 | 370/329 |
| 2012/0054349 A1* | 3/2012 | Chandrasekaran | H04L 12/56 | 709/227 |
| 2012/0117458 A1* | 5/2012 | Holloway | G06F 16/958 | 715/234 |
| 2013/0035117 A1* | 2/2013 | Litkouhi | H04L 67/12 | 455/456.4 |
| 2013/0219480 A1* | 8/2013 | Bud | G06F 21/32 | 726/7 |
| 2015/0058976 A1* | 2/2015 | Carney | H04L 63/1458 | 726/22 |
| 2015/0220997 A1* | 8/2015 | Proctor | G06F 16/958 | 705/14.66 |
| 2015/0254443 A1* | 9/2015 | Blessing | G06F 21/32 | 726/7 |
| 2016/0036837 A1* | 2/2016 | Jain | H04L 63/1416 | 726/23 |
| 2016/0050229 A1* | 2/2016 | Patel | H04L 63/1458 | 726/23 |
| 2016/0080413 A1* | 3/2016 | Smith | H04L 63/1458 | 726/23 |
| 2016/0127238 A1* | 5/2016 | McCollum | H04L 47/10 | 709/224 |
| 2016/0261628 A1* | 9/2016 | Doron | H04L 63/1458 | |
| 2016/0277959 A1* | 9/2016 | Venkataraman | H04L 45/125 | |
| 2016/0381048 A1* | 12/2016 | Zhao | H04L 63/1416 | 726/23 |
| 2017/0026404 A1* | 1/2017 | Peeler | H04L 63/1458 | |
| 2018/0004765 A1* | 1/2018 | Holloway | G06F 16/958 | |

* cited by examiner

DENIAL OF SERVICE PROTECTION FOR IP TELEPHONY SYSTEMS

TECHNICAL FIELD

This disclosure relates generally to protecting telecommunication systems, and more specifically, to protecting IP telephony systems from events such as denial of service attacks.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

With the transition from public switched telephone networks (PSTNs) to internet telephony, new challenges have arisen in protecting telephone networks. One consequence of transmitting telephone calls via the internet is that these calls are now subject to the vulnerabilities of the internet. One type of internet attack that is of particular concern to IP telephony systems is a denial of service attack. Due to the resource limits faced by IP telephony systems and the real-time requirements of IP telephony systems, denial of service attacks are particularly effective at disrupting the normal operations of an IP telephony system.

Denial of service attacks are used by malicious actors to effectively disable a network device. In a denial of service attack, an overwhelming number of messages are directed to a targeted networked device. The deluge of messages causes resource exhaustion on the targeted network device. Due to the resulting resource exhaustion, the targeted device is unable to process the incoming stream of messages and is thus unable to process legitimate messages in a timely manner.

Denial of service attacks can cause crippling problems in a network when directed at conventional targets, such as web server and email servers. The problems caused by denial of service attacks is even more harmful in real-time systems such as IP telephony networks. In conventional denial of service attacks, web servers and email servers are prevented from providing timely responses to external requests. In some situations, a delayed response by the targeted server may still be acceptable. For example, a delay in email delivery by a targeted email server may not even be perceived by users. In another example, a web server targeted by a denial of service attack may still be able to provide degraded, but still acceptable, performance by delivering low-bandwidth web content. In a real-time system, however, denial of service attacks completely disable the system's ability to provide any acceptable response. Significant financial harm can result from such disruptions in an IP telephony system. The effects of a denial of service attack can go beyond financial harm when directed at telephone networks such as 911 systems.

In addition to denial of service attacks, similar effects can result from non-malicious or marginally-malicious actors. Automated dialing systems are used by entities such as telemarketer and survey solicitors to automatically initiate calls. Malfunctions in these automated dialing systems or aggressive use of these system can result in excessive call volumes that can resemble a denial of service attack.

An IP telephony system must be able to operate in real-time. Due to the effects of a denial of service attack, an IP telephony system may be prevented from accepting any legitimate incoming calls. A denial of service attack may also result in unacceptably degraded quality of legitimate calls. Accordingly, there is a need for an IP telephony protection system that can prevent denial of service attacks from disrupting the operations of the IP telephony system. To address these, and other concerns, the inventors hereof have developed an IP telephony protection system, as described in detail below.

SUMMARY

In order to provide a system for protecting IP telephony systems from certain vulnerabilities of the internet, especially denial of service attacks, an IP telephony protection system, method and software program are claimed. The claimed invention provides the ability to protect an IP telephony system from denial of service attacks with minimal processing burden and using various protection schemes.

Embodiments can be used for protecting one or more components of an IP telephony network, the protection being provided by: monitoring incoming messages directed towards an intended recipient located on the IP telephony network wherein each incoming message originates from a sender; monitoring one or more levels of resource exhaustion by the intended recipient; monitoring messages that cannot be delivered to the intended recipient due to resource exhaustion; and enabling a protection scheme if the number of undeliverable messages exceeds a first threshold; wherein the enabled protection scheme further comprises: identifying one or more senders that are suspected of directing multiple incoming messages towards the intended recipient; placing the identified suspect senders on a suspected sender list; and blocking incoming messages from senders identified in a blocked sender list.

In certain embodiments, a protection scheme will further include: presenting a challenge action to a sender identified in the suspected sender list; evaluating a response provided to the challenge action by the identified suspect sender; and placing the identified suspect sender on the blocked sender list, if the evaluation determines that the identified suspect sender has not provided a correct response to the challenge action. In certain embodiments, a protection scheme will further include moving one or more senders from the suspected sender list to the blocked sender list for a predefined duration of time. In certain embodiments, a protection scheme will further include: providing information regarding senders placed on the suspected sender list to a user; and receiving input from the user, wherein the input directs movement of a sender from the suspected sender to the blocked sender list. In certain embodiments, the protection scheme is enabled for a first time duration and is disabled when the first time duration expires. In certain embodiments, the protection scheme remains enabled until it is determined that resource exhaustion no longer prevents message delivery to the intended recipient. In certain embodiments, the challenge action requires a verbal response from the sender.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items. Reference will now be made to the accompanying drawings, wherein.

DETAILED DESCRIPTION

Embodiments disclosed herein are directed generally to an IP telephony protection system.

The term "telecommunications," as used herein, is intended to encompass voice communications or telephony, as well as other forms of communications (e.g., video communications, videoconferencing, instant messaging or IM, Short Messaging Service or SMS, emails, etc.) that may take place electronically, for example, over wireless networks, circuit-switched networks, packet-switched networks, or any combination thereof. As such, a reference to a "call" in the description of embodiment of the claimed invention may encompass a voice call, a video call or a data message.

Figure 1:
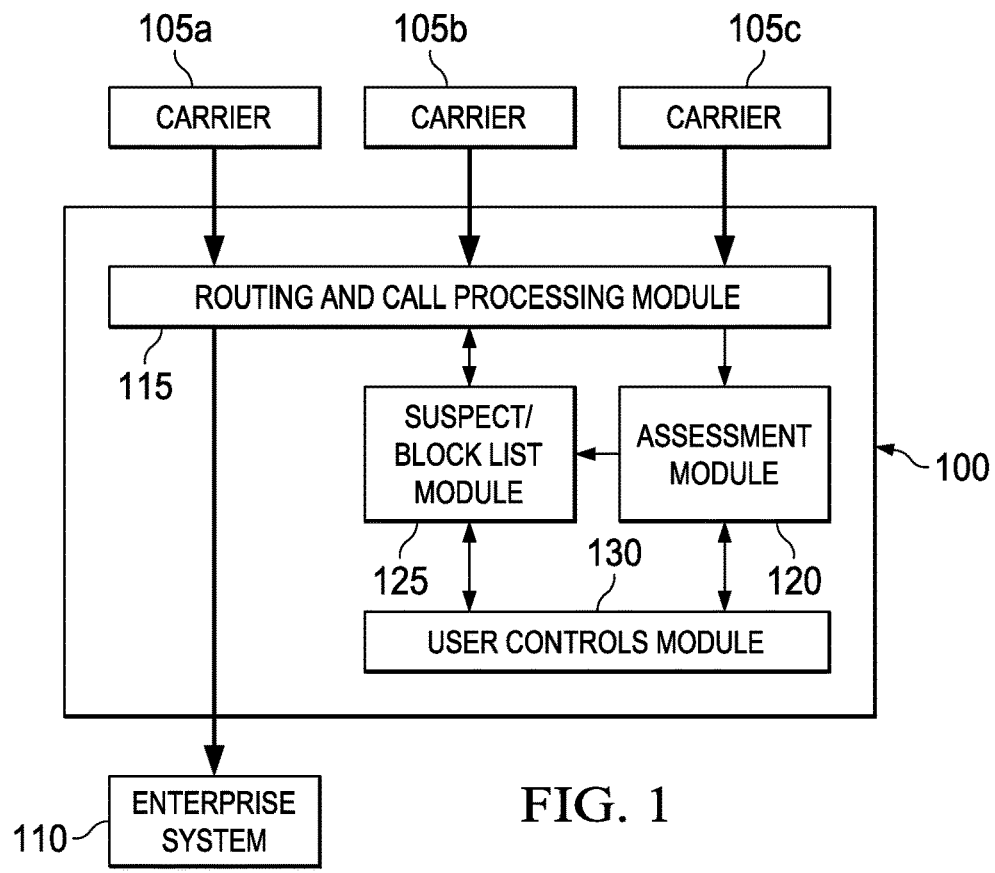
FIG. 1 is a block diagram of an IP telephony protection system according to a first embodiment.

An embodiment of the claimed invention is illustrated in FIG. 1. In the embodiment of FIG. 1, calls originate from calling parties using carriers 105a-c and are directed to an enterprise communication system 110. The incoming calls originating from carriers 105a-c are received by a media gateway control function 100. According to various embodiments, the media gateway control function 100 may be comprised within a standalone device or it may be a component of a larger IP telephony device. One of the functions of the media gateway control function 100 is to process the calls received via carriers 105a-c and to route these calls to enterprise system 110. Another function of the media gateway control function 100 illustrated in FIG. 1 is to protect the enterprise system 110 from excessive call volume, especially excessive call volume resulting from denial of service attacks.

In the embodiment of FIG. 1, incoming calls are received by a routing and call processing module 115 of the media gateway control function 100. This module is responsible for processing calls incoming via carriers 105a-c. One call processing function provided by the routing and call processing module 115 is to enable protection schemes that block calling parties that have been previously identified as participating in attacks or otherwise generating undesirable call volume. If a protection scheme has been enabled, the routing and call processing module 115 checks the identity of each calling party against the entries of the block caller list to determine whether the incoming call should be immediately rejected. In some embodiments, the list of blocked calling parties is received from external systems by the media gateway control function 100. In such embodiments, the list of blocked calling parties will contain data aggregated by internet security organizations based on attacks observed throughout the internet. In some embodiments and as described below, the list of blocked calling partied utilized by the media gateway control function 100 may also contain calling parties previously identified as malicious by the media gateway control function 100. In the embodiment of FIG. 1, the list of blocked calling parties is maintained by suspect/block list module 125.

In order to protect the enterprise system 110 from denial of service attacks, the media gateway control function 100 evaluates the incoming calls received from carriers 105a-c and determines whether any calling parties appears to be contributing to an attack or is otherwise causing undesirable call volume. A responsibility of the routing and call processing module 115 is to monitor the available call capacity of the enterprise system 110. Based on its monitoring of the available call capacity, the routing and call processing module 115 determines when incoming calls received from carriers 105a-c have saturated the channels available to enterprise system 110. In some embodiments, saturation will be determined by the routing and call processing module 115 based on the number PRI channels and/or SIP sessions that remain available to the enterprise system 110. Once this point of saturation is reached, the routing and call processing module 115 must resort to blocking any additional incoming calls intended for enterprise system 110. In the embodiment of FIG. 1, the routing and call processing module 115 triggers the activation of a protection scheme once call blocking begins due to resource exhaustion. The protection scheme activated by the routing and call processing module 115 will identify calling parties suspected of participating in an attack and provide the ability to block further calls by any calling parties suspected of participating in the attack.

In some embodiments, the threshold for triggering the activation of a protection scheme by the media gateway control function 100 may be configurable. For instance, a protection scheme may be enabled based on available call capacity of the enterprise system 110 dropping below a configurable threshold. In some embodiments, saturation may be determined based on metrics other than call capacity available to enterprise system 110. For instance, a protection scheme may be triggered by the routing and call processing module 115 based on other indicators of resource exhaustion by one or more components of the enterprise system 110, such as available memory and/or processor loads.

By waiting to enable a protection scheme and begin blocking calls until a problematic level of resource exhaustion has been identified in the enterprise system 110, the media gateway control function 100 minimizes the processing burden of providing protection services. Enforcing a protection scheme requires the media gateway control function 100 to expend resources that could otherwise be used in providing core call processing and routing services. To minimize this drain on resources, the media gateway control function 100 does not enable a protection scheme until a need for it has been identified.

The media gateway control function 100 may provide a suite of protection schemes that identify suspect calling parties and take various different actions to block suspected calling parties from further calls to the enterprise system 110. An appropriate protection scheme may be selected by the routing and call processing module 115 based on various parameters of the system, the current threat environment and/or inputs from external systems. In some embodiments, the selection of a protection scheme by the routing and call processing module 115 may be based at least in part on user input.

The media gateway control function, according to some embodiments, will also be capable of concurrently enforcing different protection schemes for different enterprise systems.

The illustrated embodiments only refer to a single enterprise system that is being protected by the media gateway control function. However, multiple enterprise systems may be protected concurrently, with the determination of whether to activate a protection scheme and the selection of protection scheme particularized to each enterprise system.

Protection schemes may vary in duration and the manner in which they are disabled. In some embodiments, a protection scheme is enabled for a specified length of time. In such embodiments, a protection scheme is enforced by the media gateway control function 100 for the specified length of time and then disables the protection scheme. Other embodiments will keep a protection scheme active until the enterprise system 110 is determined to no longer be in a state of resource exhaustion.

In the embodiment of FIG. 1, the media gateway control function 100 maintains a list of suspect calling parties that contains information identifying calling parties that are suspected of participating in attacks or otherwise responsible for undesirable call volume. In this embodiment, the media gateway control function 100 begins each protection scheme session with an empty list of suspected calling parties and builds the suspect caller list by adding parties to the list based on their observed calling behavior. In some embodiments, this list may include information received by the media gateway control function 100 from external systems. In some embodiments, the list may contain calling parties previously identified as suspect by the media gateway control function 100. In the embodiment of FIG. 1, the list of suspected calling parties is maintained by suspect/block list module 125.

In the protection scheme selected in the embodiment illustrated in FIG. 1, the routing and call processing module 115 records information identifying the calling party of each call received from carriers 105a-c. This incoming call information is provided by the routing and call processing module 115 to an assessment module 120. The assessment module 120 uses this information to identify repeated calls from individual calling parties. The assessment module 120 places these repeat calling parties in the list of suspected calling parties that is maintained by the suspect/block list module 125. In some embodiments, the assessment module 120 may base the decision to place a calling party in the list of suspected callers based on additional criteria, such as the duration of prior calls by a calling party and/or any geographic location information that is available for a calling party.

In the protection scheme of the embodiment of FIG. 1, the assessment module 120 provides an alert indicating that calling parties have been added to the list of suspected callers. This alert notifies a user that action is required in order to move calling parties from the list of suspected callers to the list of blocked callers. The media gateway control function 100 includes a user controls module 130 by which a user can evaluate the calling parties that have been added to the suspected caller list by the assessment module 120. Via controls provided by the user controls module 130, a user may select any or all entries in the suspected caller list that should be moved to the blocked caller list. This input received from the user is provided from the user controls module 130 to the suspect/block list module 125 where this change is made. The routing and call processing module 115 begins using this updated blocked caller list to prevent further calls from the calling parties identified from the user from reaching the enterprise system 110. In this manner, the routing and call processing module 115 monitors calls intended for the enterprise system 110 and activates a protection scheme that prevents malicious callers from burdening the enterprise system 110.

Reliance on user controls introduces a delay in the ability of the media gateway control function 100 to responds to potential threats. However, some scenarios encountered by the media gateway control function 100 will benefit from a human in the loop. For instance, certain legitimate events may produce call patterns that resemble denial of service attacks. One example are mass calling events in response to radio station promotions. The promise of free tickets by a radio station can encourage repeated attempts by a calling party to reach the radio station. Certain enterprise systems that are known to be used for such mass calling events may prefer to utilize human decision making in determining whether a calling party should be blocked. For enterprise systems such as a 911 system, blocking any calling party would be done cautiously and would commonly be done using human input.

Figure 4:
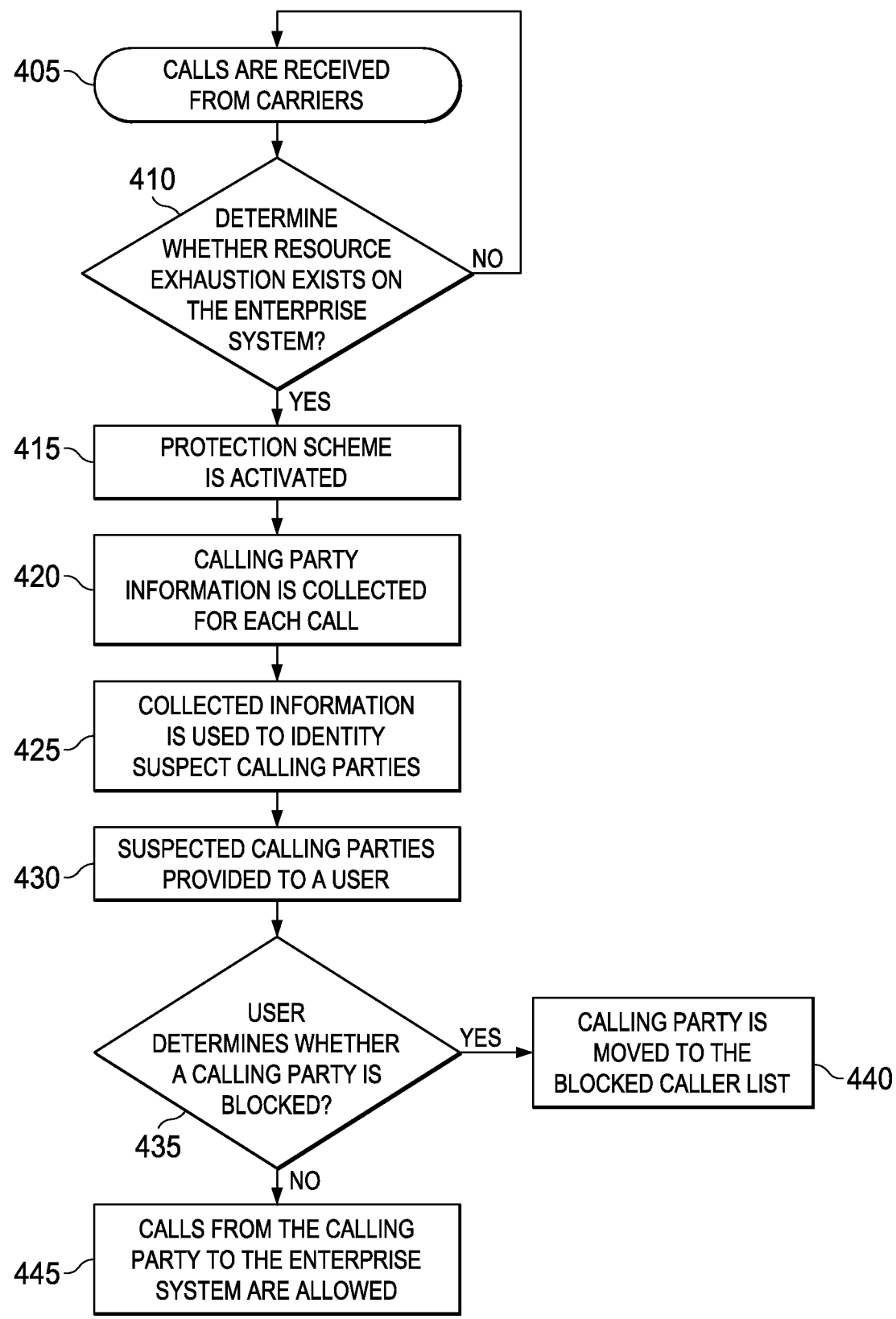
FIG. 4 is a flowchart of a method for IP telephony protection according to the embodiment illustrated in FIG. 1.

Certain of the steps undertaken by the media gateway control function 100 with respect to the embodiment of FIG. 1 are further described in the flowchart of FIG. 4.

Figure 2:
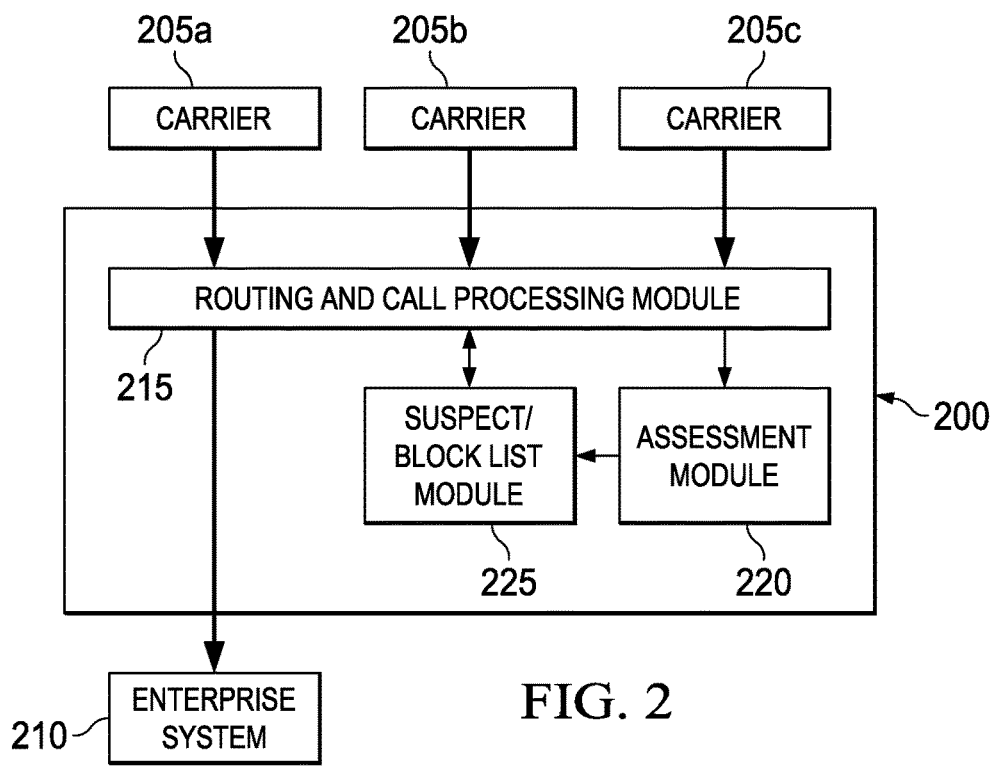
FIG. 2 is a block diagram of an IP telephony protection system according to a second embodiment.

FIG. 2 illustrates another embodiment. The embodiment of FIG. 2 utilizes the same components as those in the embodiment of FIG. 1, except for the lack of a user controls module 130 in the embodiment of FIG. 2. No user controls module is present in FIG. 2 since this embodiment uses a different protection scheme that does not require user input. In the embodiment of FIG. 2, the routing and call processing module 215 selects a protection scheme where suspect calling parties are automatically blocked for a specified duration of time.

As with the embodiment of FIG. 1, once the protection scheme has been activated, the routing and call processing module 215 in the embodiment of FIG. 2 provides the assessment module 220 information identifying the calling party of each call received via carriers 205a-c. As before, the assessment module 220 tracks the number of calls received from each calling party and uses this information to identify suspect callers. As before, other embodiments may use additional information to identify suspect callers. As suspected callers are identified by the assessment module 220, the caller identification information is added to the suspect caller list maintained by the suspect/block list module 225.

In the embodiment of FIG. 2, the routing and call processing module 215 has selected a protection scheme where calling parties identified in the blocked caller list are blocked by the routing and call processing module 215. However, due to management of the blocked caller list by the suspect/block list module 225, suspected calling parties only remain in the blocked caller list for a specified time duration. As suspect callers are identified by the assessment module 220, these calling parties are added to the blocked caller list maintained by the suspect/block list module 225. A timer is set for certain entries in the blocked caller list. The suspect/block list module 225 removes a calling party from the blocked caller list after the timer associated with that entry has expired. In some embodiments, a calling party that is removed from the blocked caller list due to expiration of a blocking duration will be placed in the suspect caller list such that the calling party may be placed back in the blocked caller list based on continued monitoring of the calling party. In some embodiments, suspected parties to be blocked for a finite time duration may not be placed in the blocked caller list and instead may be subjected to blocking for specified duration from the suspected caller list using a timer.

In this manner, the protection scheme utilized by the embodiment of FIG. 2 automatically limits the frequency of calls from all calling parties to the enterprise system 210. In some embodiments, the timer set by the suspect/block list module 225 may be configured by the assessment module 220 based on indicators that a calling party is likely a malicious actor participating in an attack. This allows calling parties repeatedly identified as suspected calling parties by the assessment module 220 to face increasingly longer delays in the frequency of calls that can be completed to enterprise system 210.

Figure 5:
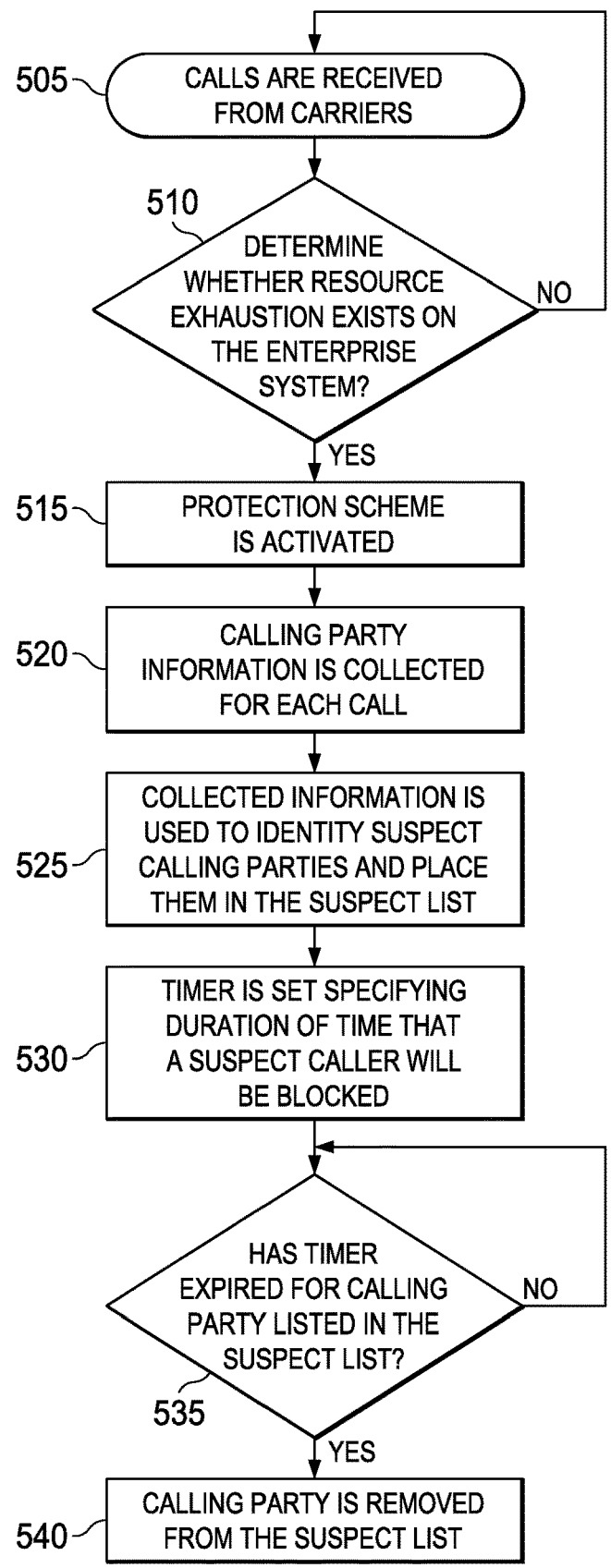
FIG. 5 is a flowchart of a method for IP telephony protection according to the embodiment illustrated in FIG. 2.

Certain of the steps undertaken by the media gateway control function 200 with respect to the embodiment of FIG. 2 are further described in the flowchart of FIG. 5.

Figure 3:
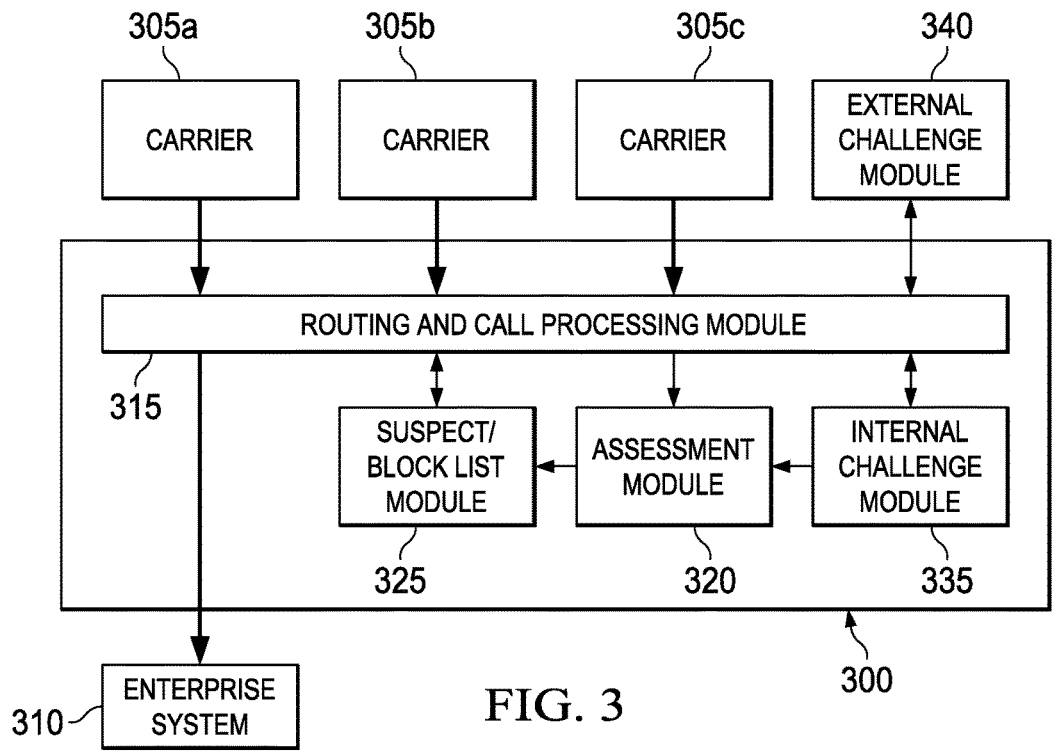
FIG. 3 is a block diagram of an IP telephony protection system according to a third embodiment.

FIG. 3 illustrates another embodiment of the claimed invention. The embodiment of FIG. 3 utilizes the same components as those in the embodiment of FIG. 2, except for the addition of an internal challenge module 335 and an external challenge module 340. In the embodiment of FIG. 3, the media gateway control function 300 has selected a protection scheme where certain of the calling parties listed in the suspect callers list are required to provide a correct response to a challenge in order to be removed from the suspect caller list.

As with the embodiments of FIGS. 1 and 2, once the protection scheme has been activated, the routing and call processing module 315 in the embodiment of FIG. 3 provides the assessment module 320 information identifying the calling party of each call received via carriers 305*a-c*. As before, the assessment module 320 tracks the number of calls received from each calling party and uses this information to identify suspect callers. As before, other embodiments may use additional information to identify suspect callers. As suspected callers are identified by the assessment module 320, the caller identification information is added to the suspect caller list maintained by the suspect/block list module 325.

In the embodiment of FIG. 3, certain of the calling parties listed in the suspect caller list are subjected to a challenge. As before, the routing and call processing module 315 processing incoming calls received via carriers 305*a-c* and determines if a calling party is listed on the suspect caller list or the block caller list. As before, once the protection scheme has been enabled, the routing and call processing module 315 of FIG. 3 blocks all calls determined to originate from a calling party listed in the blocked caller list. In the embodiment of FIG. 3, the routing and call processing module 315 includes the additional responsibility of issuing a challenge to calling parties identified in the suspect caller list.

The routing and call processing module 315 relies on an internal challenge module 335 and external challenge module 340. The internal challenge module 335 is a component of the media gateway control function 300. The external challenge module 340 is a component of an external device or system. Both the internal challenge module 335 and the external challenge module 340 issue challenges to calling parties identified by the routing and call processing module 315 as being listed in the suspect calling list. Both the internal challenge module 335 and the external challenge module 340 are also tasked with evaluating responses to issued challenges. Certain embodiments may rely on only one of the internal challenge module 335 and the external challenge module 340.

In some embodiments, the external challenge module 335 may be configured to utilize more sophisticated technology than is available to the internal challenge module 335. For instance, an external challenge module 340 may be configured to utilize interactive voice response systems for evaluating verbal responses from calling parties in response to a challenge. In such embodiments, the external challenge module 340 would issue a challenge to a calling party that could be answered verbally. For instance, the external challenge module 340 may use computer generated speech to demand that a calling party provide the current month as a digit number. In response, the calling party would speak an answer such as "zero-two," to assert that the current month is February. The external challenge module 340 utilizes an interactive voice response system to process the verbal response and to determine whether the processed response provides the correct answer to the challenge issued to the calling party. Other technologies that may be used by an external challenge module 340 include CAPTCHA distorted text recognition challenges that allow the media gateway control function 300 to verify that the calling party is an actual person and not a computer. An internal challenge module 335 may provide less resource intensive challenge functions, such as challenges based on responses provided by keypad inputs provided by a calling party.

If a challenged calling party is determined to have provided a correct response, the assessment module 320 is notified and provided with the identity of the calling party that has provided the correct response. The assessment module signals the suspect/block list module 325 to remove this calling party from the suspect caller list. The assessment module 320 may further utilize this information in further configuring the process by which it identifies calling parties as suspect. With this calling party removed from the suspect caller list, the routing and call processing module 315 connects the calling party to the enterprise system 310. Future calls by the calling party to the enterprise system 310 are allowed by the routing and call processing module 315 until the calling party is again placed on the suspect list or the block list.

If a challenged calling party provides an incorrect response to a challenge, the internal challenge module 335 and the external challenge module 340 notify the routing and call processing module 315. The routing and call processing module 315 then blocks the pending call from the calling party that has provided the incorrect response. The assessment module 315 is also notified of the incorrect response to the challenge by the calling party. The assessment module 315 determines whether the calling party is moved from the suspect list the blocked caller list. If the assessment module determines a change is warranted, it signals the suspect/block list module 325 to make updates to both lists. In some embodiments, the assessment module 315 determines whether to switch a calling party from the suspect list to the block list based on the number of previous incorrect challenge responses provided by the calling party. In some embodiments, calling parties providing an incorrect challenge response may be directed to an alternate phone number or system that will provide escalated treatment of the situation.

Figure 6:
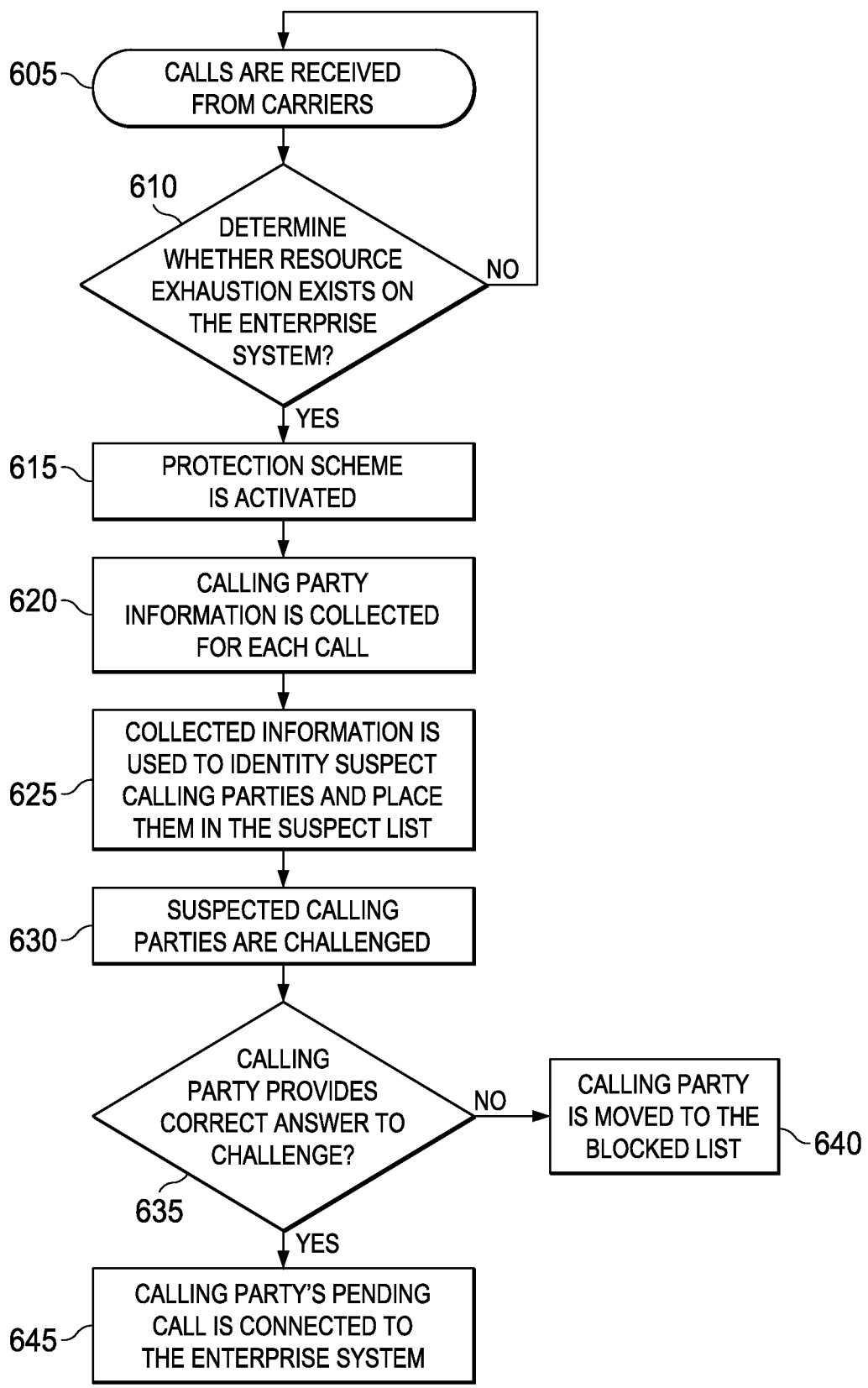
FIG. 6 is a flowchart of a method for IP telephony protection according to the embodiment illustrated in FIG. 3.

Certain of the steps undertaken by the media gateway control function 300 with respect to the embodiment of FIG. 3 are further described in the flowchart of FIG. 6.

Figure 7:
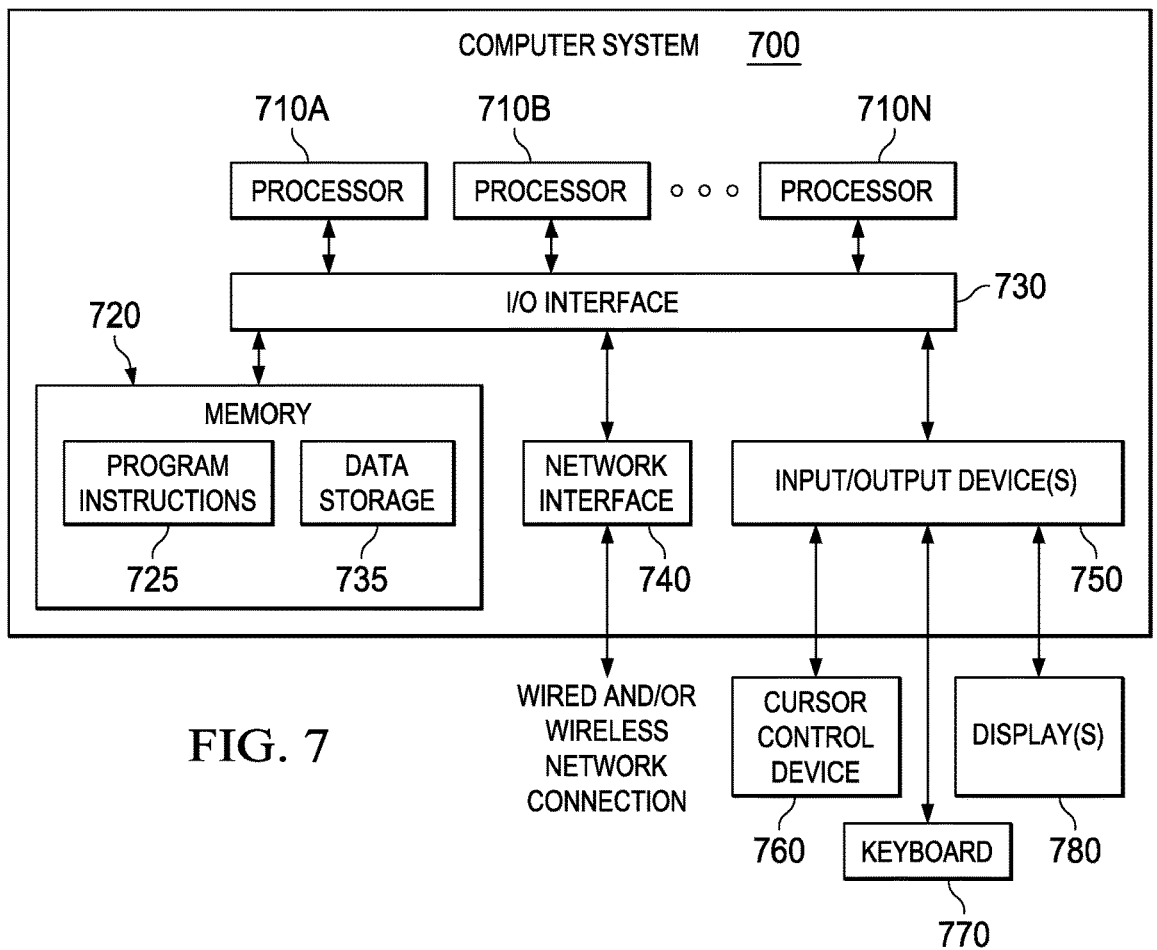
FIG. 7 is block diagram of an illustrative telecommunications system that could be used to implement the IP telephony protection system according to some embodiments.

As noted above, embodiments of the IP telephony protection system may be implemented or executed, at least in part, by one or more computer systems, including a computer system providing the services of a media gateway control function. One such computer system is illustrated in FIG. 7. In various embodiments, computer system 700 may be a server, a workstation, a desktop computer, a laptop, a tablet computer, a mobile device, a smart phone, or the like. In some cases, system 700 may be used to implement media gateway control function of FIGS. 1-3. As illustrated, computer system 700 includes one or more processor(s) 710A-N coupled to a system memory 720 via an input/output (I/O) interface 730. Computer system 700 further includes a network interface 740 coupled to I/O interface 730, and one or more input/output devices 750, such as cursor control devices 760, keyboard 770, and display(s) 780.

In various embodiments, computer system 700 may be a single-processor system including one processor 710A, or a multi-processor system including two or more processors 710A-N (e.g., two, four, eight, or another suitable number). Processor(s) 710A-N may include any processor capable of executing program instructions. For example, in various embodiments, processor(s) 710A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 710A-N may commonly, but not necessarily, implement the same ISA. Also, in some embodiments, at least one processor 710A may be a graphics processing unit (GPU) or other dedicated graphics-rendering device.

System memory 720 may be configured to store program instructions (e.g., the media gateway control function) and/or data accessible by processor(s) 710A-N. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIGS. 1-6, may be stored within system memory 720 as program instructions 725 and data storage 735, respectively. Additionally or alternatively, the media gateway control function may be a software program that is stored within system memory 720 and is executable by processor(s) 710A-N. In other embodiments, program instructions and/or data may be received, sent or stored upon different types of computer-accessible media or on similar media separate from system memory 720 or computer system 700. Generally speaking, a computer-accessible medium may include any tangible or non-transitory storage media or memory media such as electronic, magnetic, or optical media—e.g., disk or CD/DVD-ROM coupled to computer system 700 via I/O interface 730. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 730 may be configured to coordinate I/O traffic between processor(s) 710A-N, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor(s) 710A-N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor(s) 710A-N.

Network interface 740 may be configured to allow data to be exchanged between computer system 700 and other devices attached to a network, such as other computer systems. In various embodiments, network interface 740 may support communication via wired or wireless general data networks, such as any suitable type of Ethernet network, for example; via telecommunications/telephony networks such as analog voice networks or digital fiber communications networks; via storage area networks such as FibreChannel SANs, or via any other suitable type of network and/or protocol.

Input/output devices 750 may, in some embodiments, include one or more display terminals, keyboards, keypads, touchpads, scanning devices, RFID readers, NFC readers, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement certain embodiments described herein, and data storage 735, comprising various data may be accessible by program instructions 725. In an embodiment, program instructions 725 may include software elements of embodiments illustrated in the above figures. For example, program instructions 725 may be implemented in various embodiments using any desired programming language, scripting language, or combination of programming languages and/or scripting languages (e.g., C, C++, C#, Java™, JavaScript™, Perl, etc.). Data storage 735 may include data that may be used in these embodiments (e.g., recorded communications, profiles for different modes of operations, etc.). In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for protecting one or more components of an IP (Internet Protocol) telephony network, comprising:
   monitoring incoming calls directed towards an enterprise calling system that is provided IP telephony calling by the IP telephony network wherein each incoming call originates from a caller, wherein the enterprise calling system is assigned a call capacity comprising a plurality of communication channels;
   monitoring resource exhaustion within the enterprise calling system by monitoring a number of available communication channels from the plurality of communication channels assigned for use by the enterprise calling system within the IP telephony network; and
   enabling a protection scheme when the resource exhaustion monitoring indicates the available call capacity has dropped below a first threshold; wherein the enabled protection scheme further comprises:
   identifying a suspect caller that has attempted to complete multiple incoming calls to the enterprise calling system;
   determining whether the suspect caller is identified in a suspect caller list, wherein each suspect in the suspect caller list is associated with a duration;
   adding the suspect caller to a suspect caller list when the suspect caller is not identified in the suspect caller list, wherein the duration associated with the suspect caller is set to a first duration;
   extending the duration associated with the suspect caller when the suspect caller is identified in the suspect caller list; and
   blocking incoming calls from suspect callers in the suspected caller list until the expiration of the duration associated with the suspect caller.

2. The method of claim 1, wherein the enabled protection scheme further comprises:
   presenting a first challenge action to a caller identified in the suspected caller list, wherein the first challenge action determines whether the caller is an automated calling system;
   evaluating a response provided to the first challenge action by the identified suspect caller; and
   moving the identified suspect caller from the suspected caller list to a blocked caller list, when the evaluation determines that the identified suspect caller has not provided a correct response to the first challenge action.

3. The method of claim 2, wherein the enabled protection scheme further comprises:
   blocking incoming calls from suspect callers identified in the blocked caller list.

4. The method of claim 1, wherein the enabled protection scheme further comprises:
   providing information regarding callers placed on the suspected caller list to a user; and
   receiving input from the user, wherein the input directs movement of a caller from the suspected caller to a blocked caller list.

5. The method of claim 3, wherein the protection scheme is enabled for the enterprise calling system for a second time duration and is disabled when the second time duration expires.

6. The method of claim 1, wherein the protection scheme remains enabled for the enterprise calling system until it is determined that the number of available communication channels assigned for use by the enterprise calling system exceeds the first threshold.

7. The method of claim 2, the method further comprising:
   presenting a second challenge action to a caller identified in the suspected caller list, wherein the second challenge action requires a manual input by the caller; and
   wherein the first challenge action requires a verbal response from the caller.

8. A tangible computer-readable storage device having program instructions stored thereon that, upon execution by a computer system for protecting a plurality of enterprise calling systems served by an IP telephony network, cause the computer system to:
   monitor incoming calls directed towards an enterprise calling system of the plurality of enterprise calling systems that is provided IP telephony calling by the IP (Internet Protocol) telephony network wherein each incoming call originates from a sender, wherein the enterprise calling system is assigned a call capacity comprising a plurality of communication channels;
   monitor resource exhaustion within the enterprise calling system by monitoring a number of available communication channels from the plurality of communication channels assigned for use by the enterprise calling system within the IP telephony network; and
   enable a protection scheme when the resource exhaustion monitoring indicates the available call capacity has dropped below a first threshold, wherein the executed program instructions of the enabled protection scheme further cause the computer system to:
- identify a suspect sender that has attempted to complete multiple incoming calls to the enterprise calling system;
- determine whether the suspect caller is identified in a suspect caller list, wherein each suspect in the suspect caller list is associated with a duration;
- add the suspect caller to a suspect caller list when the suspect caller is not identified in the suspect caller list, wherein the duration associated with the suspect caller is set to a first duration;
- extending the duration associated with the suspect caller when the suspect caller is already identified in the suspect caller list; and
- block incoming calls from suspect callers in the suspected caller list until the expiration of the duration associated with the suspect caller.

9. The tangible computer-readable storage device of claim 8, wherein the program instructions, upon execution by the computer system, further cause the computer system to:
- present a first challenge action to a sender identified in the suspected sender list, wherein the first challenge action determines whether the sender is an automated calling system;
- evaluate a response provided to the first challenge action by the identified suspect sender; and
- move the identified suspect sender from the suspected sender list to a blocked sender list, when the evaluation determines that the identified suspect sender has not provided a correct response to the first challenge action.

10. The tangible computer-readable storage device of claim 9, wherein the program instructions, upon execution by the computer system, further cause the computer system to:
- block incoming calls from suspect callers identified in the blocked caller list.

11. The tangible computer-readable storage device of claim 8, wherein the program instructions, upon execution by the computer system, further cause the computer system to:
- provide information regarding senders placed on the suspected sender list to a user; and
- receive input from the user, wherein the input directs movement of a sender from the suspected sender list to a blocked sender list.

12. The tangible computer-readable storage device of claim 10, wherein the protection scheme is enabled for the enterprise calling system for a second time duration and is disabled when the second time duration expires.

13. The tangible computer-readable storage device of claim 8, wherein the protection scheme remains enabled for the enterprise calling system until it is determined that the number of available communication channels assigned for use by the enterprise calling system exceeds the first threshold.

14. The tangible computer-readable storage device of claim 9, wherein the program instructions, upon execution by the computer system, further cause the computer system to:
- present a second challenge action to a sender identified in the suspected sender list, wherein the second challenge action requires a manual input by the caller; and wherein the first challenge action requires a verbal response from the sender.

15. A system, comprising:
- one or more processors; and
- a memory device coupled to the one or more processors, the memory device storing computer-readable instructions that, upon execution by the one or more processors, cause the system to:
  - monitor incoming calls directed towards an enterprise calling system that is provided IP telephony calling by the IP telephony network wherein each incoming message originates from a sender, wherein the enterprise calling system is assigned a call capacity comprising a plurality of communication channels;
  - monitor resource exhaustion within the enterprise calling system by monitoring a number of available communication channels from the plurality of communication channels assigned for use by the enterprise calling system within the IP telephony network; and
  - enable a protection scheme when the resource exhaustion monitoring indicates the available call capacity has dropped below a first threshold, wherein the executed program instruction of the enabled protection scheme further cause the system to:
    - identify a sender that has attempted to complete multiple incoming calls to the enterprise calling system;
    - determine whether the sender is identified in a suspect caller list, wherein each suspect in the suspect caller list is associated with a duration;
    - add the sender caller to a suspect caller list when the sender is not identified in the suspect caller list, wherein the duration associated with the sender is set to a first duration;
    - extend the duration associated with the sender when the sender is already identified in the suspect caller list; and
    - block incoming calls from suspect callers in the suspected caller list until the expiration of the duration associated with the sender.

16. The system of claim 15, wherein the system is further configured to:
- present a first challenge action to a sender identified in the suspected sender list, wherein the first challenge action determines whether the sender is an automated calling system;
- evaluate a response provided to the first challenge action by the identified suspect sender; and
- move the identified suspect sender from the suspected sender list to a blocked sender list, when the evaluation determines that the identified suspect sender has not provided a correct response to the first challenge action.

17. The system of claim 16, wherein the system is further configured to:
- block incoming calls from suspect callers identified in the blocked caller list.

18. The system of claim 15, wherein the system is further configured to:
- provide information regarding senders placed on the suspected sender list to a user; and
- receive input from the user, wherein the input directs movement of a sender from the suspected sender list to a blocked sender list.

19. The system of claim 17, wherein the protection scheme is enabled for the enterprise calling system for a second time duration and is disabled when the second time duration expires.

20. The system of claim 15, wherein the protection scheme remains enabled for the enterprise calling system until it is determined that the number of available communication channels assigned for use by the enterprise calling system exceeds the first threshold.

\* \* \* \* \*